Nov. 19, 1963 P. METZ 3,111,397
METHOD OF PRODUCING DENSE REFRACTORY
BLOCKS HAVING LARGE DIMENSIONS
Filed Dec. 6, 1961

INVENTOR.
PAUL METZ
BY
ATTORNEY.

3,111,397
METHOD OF PRODUCING DENSE REFRACTORY
BLOCKS HAVING LARGE DIMENSIONS
Paul Metz, Dudelange, Luxembourg, assignor to Arbed—
Acieries Reunies de Burbach-Eich-Dudelange, Luxembourg, Luxembourg, a corporation of Luxembourg
Filed Dec. 6, 1961, Ser. No. 157,363
Claims priority, application Luxembourg Dec. 12, 1960
1 Claim. (Cl. 25—156)

This invention relates generally to the production of refractory bricks or blocks from mixtures of refractory materials and organic binders.

The bottoms of converters and certain refractory bricks or blocks are produced from mixtures of refractory materials, such as, magnesia, dolomite or the like, and organic binding agents. These mixtures are conventionally compacted by pressure, tamping, applied impacts or vibration, or by combinations of the foregoing means. It has been previously proposed, for example, in Luxembourg Patent No. 32,278, of July 14, 1953, to which British Patent No. 754,784 corresponds, that the useful life of converter bottoms and refractory bricks formed from mixtures of refractory materials and organic binders could be substantially extended by heating the converter bottoms or bricks following the above mentioned initial compacting thereof to a temperature between 100 and 350° C., and then further compacting the heated converter bottoms or bricks by applying impacts or vibrations thereto. The foregoing steps serve to increase the density of the mixture of refractory materials and organic binders which forms the converter bottom or bricks, and this increased density or high degree of compactness is mainly due to the fact that vapors are formed from the organic binders during the heating thereof and are under a certain pressure as a result of the initial compacting of the mixture, so that such vapors are liberated abruptly during the additional compacting of the mixture by impacts or vibration, and the liberated or escaping vapors entrain the local inclusions of air and organic binder. Such entrainment of local inclusions of air and organic binder is assisted by the low viscosity of the latter at the elevated temperatures at which the additional compacting operation is performed. The high degree of compactness of the mixture achieved in this manner serves to extend the useful life of converter bottoms and refractory bricks formed therefrom. However, the effective use of the described method for increasing the useful life of converter bottoms and refractory bricks requires that the heating thereof be effected in a rapid and uniform manner.

In producing refractory bricks having relatively small dimensions, the relatively rapid and uniform heating thereof can be achieved by placing the molds containing the mixture of refractory materials and organic binders in a heating oven through which hot gases are circulated so that the heat is applied to each brick from the exterior of the latter. In producing converter bottoms, the latter are normally provided with bricks having holes extending therethrough to form the tuyeres and which are surrounded by the mixture of refractory materials and organic binders so that, even though the converter bottom has relatively large dimensions, the necessary relatively rapid and uniform heating of the mixture can be effected as a preliminary to the additional compacting thereof by simultaneously exposing the mixture to external heating, as by hot gases, and to heating introduced therein through the tuyeres, as by passing hot gases through the latter or by introducing electrical heating elements into the tuyeres.

However, in the production of refractory blocks having large dimensions, the necessary relatively rapid and uniform heating of the mixture of refractory materials and organic binders as a preliminary to the additional compacting thereof cannot be achieved merely by external heating as used in the production of refractory bricks of relatively small dimensions. Such mere external heating of the blocks having relatively large dimensions requires a very long heating period which increases the viscosity of the organic binder, with consequent reduction of the effectiveness of the removal of inclusions thereof, and which reduces the efficiency of utilization of the heating apparatus or installation.

Accordingly, it is an object of the present invention to provide methods by which the previously proposed measures for increasing the density, and hence the useful life of converter bottoms and refractory bricks formed of mixtures of refractory materials and organic binders can be conveniently applied to the production of refractory blocks having large dimensions.

In accordance with an important aspect of this invention, the heating of the large mass of the mixture intended to form a refractory block of large dimensions is rapidly and uniformly effected by introducing heat conducting elements into the shaped mass of the block, so that, during heating of the block to a temperature in the range between approximately 100 and 350° C., at least part of the heat necessary for such heating is transmitted to the mass of the block through the heat conducting elements, whereupon the heated mass of the block is additionally compacted to drive out the vapors from the heated organic binder along with the entrained inclusions of air and binder.

The heat conducting elements introduced into the shaped mixture from which the block is to be formed may be of metal or of refractory material. Further, the heat conducting elements may be hollow, in which case heat is transmitted to the interior of the mass by either passing hot gases through the hollow heat conducting elements or by installing electrical heating units in the hollow heat conducting elements. Where the heat conducting elements are of metal, they may be in the form of solid rods which are heated by induction heating, that is, by being disposed in a high frequency magnetic field.

In accordance with another aspect of the invention, the heat conducting elements which are introduced in the mass of the block of large dimensions to permit the relatively rapid and uniform heating thereof preliminary to the additional compacting operation may be permanently retained as integral parts of the refractory block, or the heat conducting elements may be withdrawn from the mass of the block following the heating of the latter and prior to the completion of the additional compacting operation so that the cavities which are left in the mass of the block by withdrawal of the heat conducting elements are closed by the additional compacting operation.

The above, and other objects, features and advantages of the invention, will be apparent in the following detailed description of illustrative embodiments thereof which is to be read in connection with the accompanying drawing forming a part hereof, and wherein.

Figure 1:
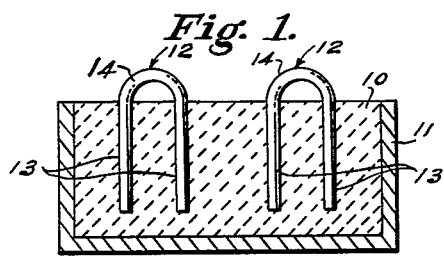
FIG. 1 is a sectional view showing the mass of a block of relatively large dimensions shaped in a mold and having heat conducting elements introduced therein in accordance with one embodiment of the invention so as to facilitate the rapid and uniform heating of the mass preliminary to the additional compacting thereof.

Referring to the drawing in detail, and initially to FIG. 1 thereof, it will be seen that, in accordance with the present invention, a refractory block of relatively large dimensions is produced by shaping a conventional mass or mixture 10 of refractory material and organic binder in a conventional mold 11 in which the mass 10 is compacted by conventional means, for example, by pressure, tamping, impacts or vibration. After the mass 10 has been initially compacted in the mold 11, the mass or mixture is heated to a temperature in the range between 100 and 350° C. In order to permit such heating to be uniformly and rapidly effected, notwithstanding the relatively large dimensions of the block which is to be formed, heat conducting elements 12 are introduced into the mass 10, and at least part of the heat required to raise the temperature of the mass to a temperature within the indicated range is transmitted to interior portions of the mass 10 through the heat conducting elements 12.

Figure 5:
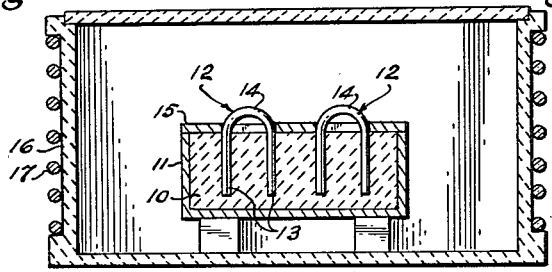
FIG. 5 is a schematic view illustrating the induction heating of the mass of a block of relatively large dimensions in accordance with an embodiment of the invention.

In the embodiment illustrated in FIG. 1, the heat conducting elements 12 are in the form of metal rods bent into U-shaped configurations so as to define legs 13 which extend into the mass 10 and which are connected together, at their outer ends, by connecting portions 14 disposed externally with respect to the mass 10 in mold 11. When the mold 11 as well as the heat conducting elements 12 are formed of a magnetic metal, for example, as in FIG. 1, induction heating can be conveniently employed for heating the mass 10 to the required temperature. Thus, as illustrated in FIG. 5, the mold 11 having a metal cover 15 which is slotted to accommodate the heat conducting elements 12 may be disposed within a conventional induction heating furnace 16 having a surrounding coil 17 which is energized with a high frequency current so as to induce eddy currents within the magnetic metal of mold 11, its cover 15 and the heat conducting elements 12, whereby the walls, bottom and cover of the mold and the elements 12 are all intensely heated and thereby transmit heat to the mass 10 at the outer surfaces of the latter, as well as in the interior thereof into which elements 12 are introduced. Accordingly, mass 10 is uniformly and rapidly heated to a temperature within the above described range so as to form vapors from the organic binder included in mass 10, which vapors are under pressure by reason of the initial compacting of the mass.

While the mass 10 is thus heated in accordance with the invention, the mass is further compacted, either by impacts or vibrations applied thereto in a conventional manner. The impacts or vibrations for effecting the additional compacting of the heated mass 10 may be applied to the latter through the mold 11 or the heat conducting elements 12, or through both the mold and the heat conducting elements. Such additional compacting of the mass 10 abruptly liberates the pressurized vapors from the organic binder and, in escaping from the mass 10, such vapors entrain the local inclusions of air and of the organic binder. Such release of the local inclusions of organic binder is facilitated by the fact that the additional compacting of the mass is effected while the latter is in the heated condition and thereby has a relatively low viscosity.

The heat conducting elements 12 may be removed from the mass 10 after the latter has been heated and prior to the completion of the additional compacting of the mass so that such compacting operation will close the cavities in the mass resulting from the withdrawal of the heat conducting elements therefrom. If the heat conducting elements 12 are to be thus withdrawn from the mass 10, the connecting portions 14 between the legs 13 of the heat conducting elements illustrated in FIGS. 1 and 5 provide a convenient means by which a tool can be used to grasp the heat conducting elements for removing the same from the heated mass. Alternatively, the heat conducting elements 12 may remain permanently embedded within the mass 10 of the completed refractory block, in which case the exposed connecting portions 14 of the heat conducting elements 12 provide convenient means by which the completed block can be transported or secured to a supporting framework.

The compacted blocks which are heated and then additionally compacted by impacts or vibrations in accordance with the present invention may be fired at a temperature between approximately 300 and 2000° C. before being installed in the furnace or the like which they are to line. In this case, the heat conducting elements 12 may also be employed for introducing heat to the interior of each block during the firing thereof, thereby to obtain more uniform heating of the fired block and improved homogeneity of the latter.

The additional compacting of the heated mass of the block by vibration or impacts, or by both vibration and impacts, may be applied intermittently and repeatedly, or continuously during the heating of the blocks to a temperature in the range between 100 and 350° C., as described above, and, if desired, the mass of the block may be still further compacted after termination of such heating thereof, but while the block is still in a heated condition.

Further, the heating of the mass of the block with the heat conducting elements 12 introduced therein may be effected under an elevated or super-atmospheric pressure, for example, in an autoclave. It is also contemplated that the subsequent compacting of the heated mass of the block by vibration or by impact may be effected in a vacuum chamber, or while a pressure is exerted against one of the surfaces of the mass of the block, for example, by means of a weight applied to the cover of the mold or by means of an hydraulic cylinder acting against one of the walls of the mold, thereby to further encourage the escape of the vapors of the organic binder from the mass of the block.

Figure 2:
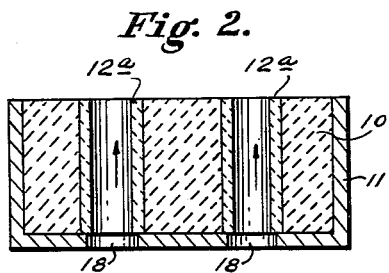
FIGS. 2, 3 and 4 are views similar to that of FIG. 1, but illustrating other embodiments of the invention.
Figure 6:
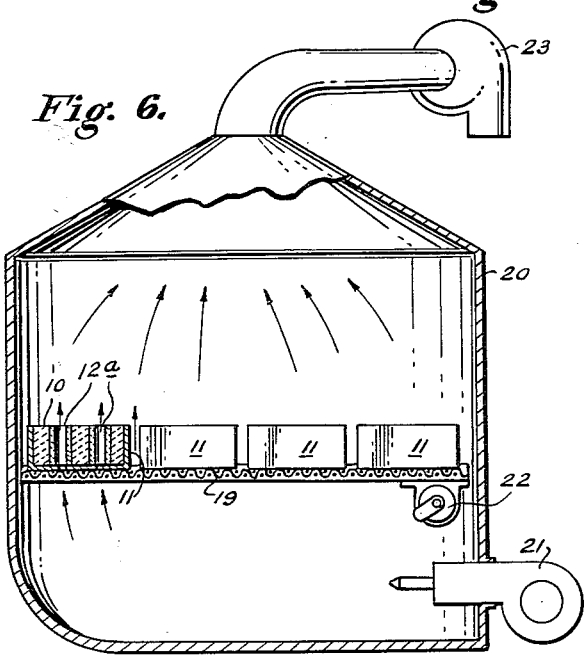
FIG. 6 is a schematic view illustrating the heating of several blocks by hot gases in accordance with another embodiment of the invention.

Although the heat conducting elements 12 of the embodiment illustrated in FIG. 1 are solid rods of a magnetic metal, it is to be noted that the heat conducting elements introduced into the mass of the large block so as to facilitate the rapid and uniform heating thereof may be hollow bodies, for example, tubes of stainless or other steel, copper, or light metals such as, magnesium or magnesium alloys, or tubes of refractory material formed of the same composition as the mass of the block, or of a different composition. Thus, as shown in FIG. 2, heat conducting elements in the form of tubes 12a of refractory material may be introduced into the mass or mixture of refractory material and organic binder within the mold 11. Where the hollow heat conducting elements are in the form of tubes 12a extending through the mass 10, the mold 11 is preferably formed with openings 18 communicating with the ends of the tubes 12a so that hot gases can be circulated through the tubular heat conducting elements which thereby transmit heat to the interior of the mass 10. With the arrangement shown in FIG. 2, heating of the mass 10 of each block may be effected by placing a number of the molds 11 on a screen or other perforated support 19 within an oven 20 to which hot gases are supplied below the perforated support 19, for example, from an oil burner 21, so that the hot gases circulate around the molds 11 and through the tubular heat conducting elements 12a in the mass 10 of each block for applying heat to the latter both externally through the walls of the mold and internally through the heat conducting elements, as indicated on FIG. 6. Further, as shown on FIG. 6, the perforated support 19 may be movably mounted within the oven 20 and have secured thereto a vibrating unit 22, for example, in the form of an electric motor driving an eccentric, so that vibrations for effecting the additional compacting of the heated mass of each block may be applied to the latter simultaneously with the heating thereof, or, at least, without requiring removal of the molds from the oven 20. In the arrangement of FIG. 6, a vacuum or relatively low pressure atmosphere may be created around the blocks in molds 11 during the additional compacting of the blocks by means of a vacuum pump or blower 23 having its inlet connected to the oven 20 above the support 19, thereby to encourage the escape of the vapors of the organic binder liberated during the vibration or other compacting of the heated mass.

Figure 3:
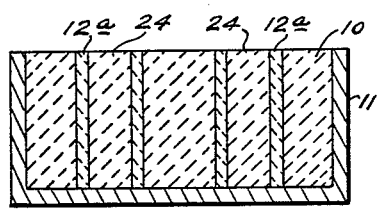

When the heat conducting elements are hollow and are intended to be permanently retained in the mass 10 of the block, such heat conducting elements are preferably filled with a refractory material after the heating of the mass of the block to the required temperature. Thus, as shown in FIG. 3, the tubular heat conducting elements 12a, shown to be of a refractory material, are filled with a refractory mixture or material, as at 24, which material may be the same as the mixture of the mass 10, or a different kind of refractory mixture, and which is compacted during the subsequent additional compacting of the mass 10 by either vibration or impacts.

Figure 4:
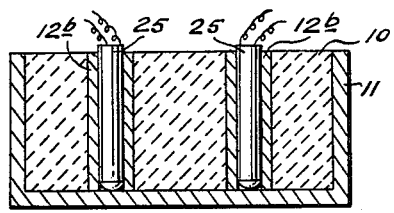

Referring now to FIG. 4, it will be seen that, where hollow heat conducting elements 12b are introduced into the mass 10 of the block, the heat transmitted through the elements 12b to the interior of the mass may be applied by electrical heating units 25 which are removably inserted in the tubular heat conducting elements. It will be understood that, when the heat is thus applied internally to the mass 10 by the electrical heating units 25, the mass is also preferably externally heated, for example, by hot gases passing around the mold 11.

The tubular heat conducting elements 12b, while being shown to be formed of metal, may alternatively be formed of a refractory material, as in the embodiment of FIG. 2, and such tubular heat conducting elements may be either permanently retained in the mass 10 of the block or withdrawn therefrom prior to the completion of the additional compacting operation. When the tubular heat conducting elements are withdrawn from the block following the heating of the latter to the necessary extent, the increased plasticity imparted to the mass 10 by the heating makes it possible for the subsequent compacting operation to fully close the cavities left in the mass 10 by the withdrawal of the heat conducting elements.

Although illustrative embodiments of the invention have been described in detail herein with reference to the accompanying drawing, it is to be understood that the invention is not limited to those precise embodiments, and that various changes and modifications may be effected therein by one skilled in the art without departing from the scope or spirit of the invention, except as defined in the appended claim.

What is claimed is:

A method of producing very high density refractory blocks of large dimensions from mixtures of refractory materials and organic binders, comprising shaping each block from the mixture, introducing heat conducting elements into the shaped block, heating the block to a temperature in the range between approximately 100 and 350° C. at least partly through said heat conducting elements extending into the block so as to achieve uniform and relatively rapid heating of the latter to said temperature, compacting the thus heated block so as to drive out vapors from the heated binder along with entrained inclusions of air and binder, and withdrawing at least some of said heat conducting elements from the block after said heating of the latter and before completion of said compacting of the heated block so that the compacting serves to close the resulting cavities in the block.

References Cited in the file of this patent

UNITED STATES PATENTS

| 771,594 | Wilhelmi | Oct. 4, 1904 |
| 2,717,225 | Williams | Sept. 6, 1955 |
| 2,990,602 | Brandmayr et al. | July 4, 1961 |

FOREIGN PATENTS

| 754,784 | Great Britain | Aug. 15, 1956 |